June 3, 1952 J. C. GILL 2,598,905
ALIGNING AND SPACING DEVICE FOR EGGS
Filed Aug. 15, 1947 2 SHEETS—SHEET 1

Inventor.
JAMES C. GILL.
By Lockwood, Goldsmith & Galt
Attorneys.

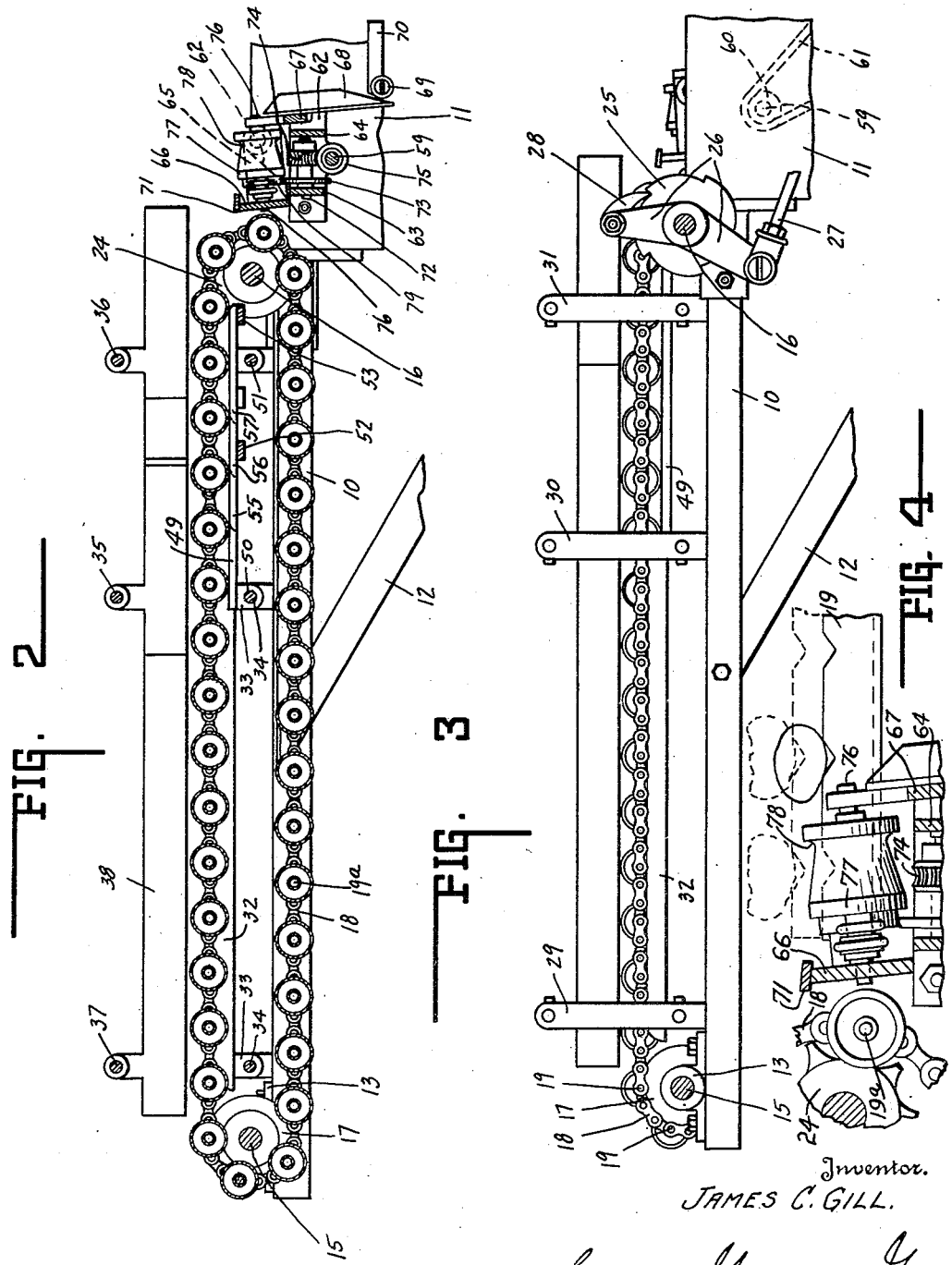

Patented June 3, 1952

2,598,905

UNITED STATES PATENT OFFICE 2,598,905

ALIGNING AND SPACING DEVICE FOR EGGS

James C. Gill, Indianapolis, Ind.

Application August 15, 1947, Serial No. 768,727

16 Claims. (Cl. 198—30)

1

This invention relates to a device for feeding eggs and similar ovoid articles for subsequent operation thereon.

Applied to eggs the present invention is intended to be supplied with eggs thirty-six at a time in squared relation and immediately contiguous to each other and while standing upon end or substantially so.

Mechanism for simultaneously removing such a group of eggs from an egg case following case opening, cell separator removal and/or flat removal forms no part of the present invention.

Eggs subjected to treatment by the present invention are supplied in six parallel rows to a finishing device such as represented by Sigler Patent No. 2,229,349 dated January 21, 1941, although therein the disclosed structure handles but one row of eggs.

For an understanding of the present invention, therefore, eggs at the discharge station thereof are picked up by bar 19, see Fig. 2 of said patent, in proper position for opening etc.

Accordingly while this patent contemplates manual directioning of the egg and deposition thereof in predetermined relation relative to bar 19, the present invention contemplates the duplication of such patented device to such member as found most convenient and expedient.

Since in a modern commercial egg processing plant the eggs are received in cases, the present invention contemplates the repetitious lifting of a layer of eggs (36 in number) disposed on end, and depositing same on an egg advancing, separating and turning conveying mechanism so that when at the discharge station the several eggs are longitudinally disposed and properly separated, having reference to corresponding eggs in the several rows (of which there are six).

Egg advance is so timed that when the eggs of one deposit have sufficiently advanced, the lifter will have, during that advance interval, returned to the case, engaged another layer of eggs, and returned to egg discharge position, corresponding in the present invention to egg receiving position.

The chief object of the present invention obviously is to receive a batch of eggs at one time, advance same, during which advance the eggs are handled automatically and guided so as to be properly oriented and spaced for reception by a multiple form of Sigler machine to the end that manual handling of individual eggs is entirely eliminated.

The chief feature of the present invention resides in the egg turning, advancing, separating and aligning means incorporated therein.

2

Other objects and features of the invention will be set forth more fully hereinafter.

The full nature of the invention will be understood from the accompanying drawings and the following description and claims:

In the drawings Fig. 1 is a top plan view of one embodiment of the invention.

Fig. 2 is a longitudinal sectional view taken on line 2—2 of Fig. 1 and in the direction of the arrows.

Fig. 3 is a side elevation of the invention.

Fig. 4 is a detail view showing the relationship between the receiving bar and the positioning rolls.

Figure 1:
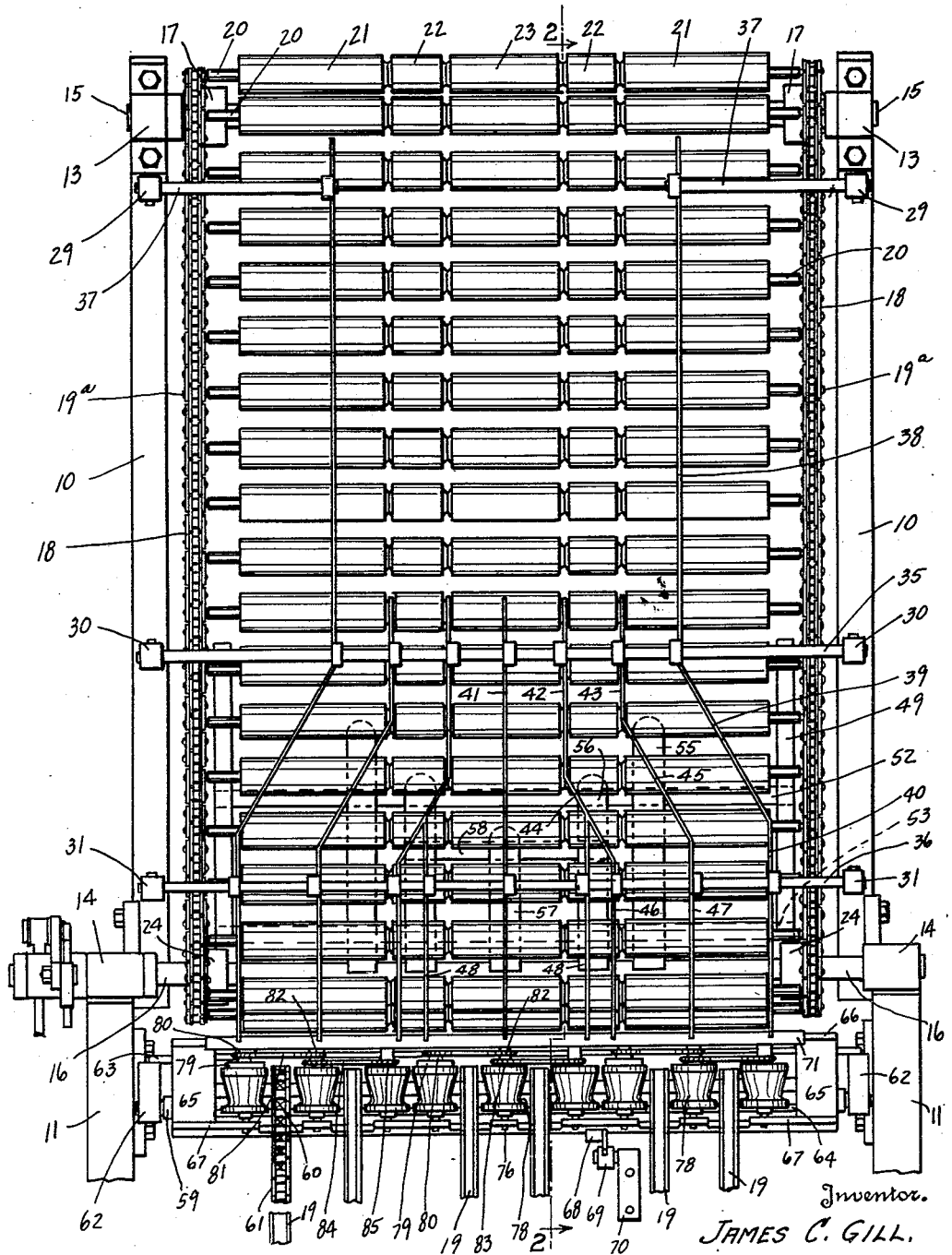

In the drawings 10 indicates a pair of spaced frame members suitably supported at one end (discharge end) by bed 11 and braced as by members 12.

Each member 10 at opposite ends includes bearings 13 and 14 in which are supported at the ends the shafts 15 and 16.

Shaft 15 at the ends within bearings 13 mounts sprockets 17 engaged by chains 18. Certain of the chain pivot pins 19ª are extended as at 20 to form intermediate roller supports. Herein five rollers are so mounted upon said shaft pins and the elongated end rollers are designated by numeral 21, the shortest intermediate rollers by numeral 22 and the central roller by numeral 23.

Shaft 16 mounts similar sprockets 24. Shaft 16 is elongated beyond one bearing 14 and mounts a ratchet wheel 25, see Fig. 3. Oscillatable on said shaft is lever arm 26 having one end connected to pitman 27 suitably powered by means not shown.

The other end of lever arm 26 pivotally supports pawl 28 adapted to maintain by gravity engagement with said ratchet. Thus as the arm is oscillated the ratchet is rotated step by step so that the endless chains are similarly advanced which obviously similarly advances all rollers from the cantilever end of the device (egg receiving end) to the opposite end (the egg discharge end).

Each frame member 10 includes uprights 29, 30 and 31. Disposed beneath the upper run of the chains is the support strip 32 carried by arms 33 supported by uprights 39 and 30 at 34.

The upper ends of uprights 30 and 31 are connected by rods 35 and 36. Projecting inwardly from the upper ends of uprights 29 are the short rods 37. The adjacent ends are not connected so that the egg lifter may be lowered for egg contact with rollers prior to release from the egg lifter aforesaid.

Elongated guide fins 38 are carried by the said rods 37, 35 and 36 and each fin includes a diverging portion 39 and an offset parallel portion 40, see Fig. 1.

Rods 35 and 36 support a median partition guide fin 41 and at opposite sides thereof two guide fins 42 and 43, each of which has a diverging portion 44 and 45 respectively and an offset parallel portion 46 and 47 respectively. Auxiliary straight fins 48 also are carried by rod 36 and biased portions 44.

It will be observed that the end rollers have centrally exposed portions just long enough for widthwise accommodation of an egg, the smallest rollers are of similar character while the central roller is long enough to accommodate two eggs side by side.

As the eggs are advanced, they being disposed lengthwise, they are separated by the fins and are turned so that the eggs, when separated lie lengthwise between adjacent rollers and are so discharged to the transfer and aligning rolls hereinafter more fully described.

The means for effecting roll rotation for egg turning comprises side auxiliary frame elements 49 connected at 50 and 51 to uprights 30 and 31. These frame members are suitably connected together by parallel member 52 and 53. Carried thereby are the transversely disposed parallel roll engageable members 55 and 56. A central roll engageable member 57, parallel to members 55 and 56, is carried by frame member 53 and the parallel auxiliary frame member 58 secured at opposite ends to members 56.

As shown in Fig. 2 when the several rolls engage members 55, 56 and 57 in roll advance toward the discharge station, such engagement effects roll rotation, which in combination with the diverging portions of the fins effects egg spreading accompanied by egg turning approximately 90° so that when discharged from these rolls the eggs are disposed lengthwise in longitudinal alignment and may be rotating about their longitudinal axes incident to roll rotation.

Reference will now be had to the transfer and aligning roll portion of the device shown at the discharge end of the machine. Rotatably supported in bed members 11 is shaft 59. Same, see Figs. 1 and 3, mounts sprocket 60 operable by chain 61 from power derived from the multiple form of the Sigler device aforesaid.

Pivotally supported in arms 62 at the ends of the end frame structure, comprising spaced members 63 and 64, is a supplementary superposed frame comprising arms 65 and members 66 and 67. From the latter depends tail 68 engageable by reciprocable roll 69 carried by arm 70 reciprocated by means not shown but operable in timed relation with and by the Sigler device. Thus the supplementary frame is tilted upwardly with respect to the end frame and intermittently.

It will be noted frame member 66 is disposed immediately contiguous to the path of the end rollers and mounts upon its upper end an egg transferring support 71.

Rotatably supported by end frame members 63 and 64 are a plurality of shafts 72 and each mounts a friction drive wheel 73 and gear 74 or the like meshing with gear 75 carried by shaft 59, see Fig. 2. Three such power units are provided.

Rotatably supported in the supplementary frame members 66 and 67 are nine shafts 76 each carrying an egg drum 77 with a reduced intermediate portion 78. Certain of these drums have friction collars 79, see Fig. 1, disposed for contact with the friction wheels 73 for drum rotation when the supplementary frame is not elevated. When elevated obviously power is not transmitted to the three powered drums.

Each powered drum has a pulley 80 rigid therewith and belt 81 drives smaller pulley 82 on the next drum shaft for driving that drum in the same direction as the powered drum but at a faster speed. Rigid with the smaller pulley 82 is a larger pulley 83 and a belt 84 therefrom drives a smaller pulley 85 faster on the remaining drum.

Thus all drums rotate in the same direction. Also since pulleys 80 and 83 are approximately the same size and pulleys 82 and 85 are approximately the same size there is a progressive increase in speed from drum to drum of any one drum power group.

Also looking at the discharge end of the device the first, fourth and seventh drums from the ratchet end rotate slowest, the second, fifth and eighth drums rotate slower than the aforesaid drums but faster than the remaining drums. Thus each egg is discharged to a pair of adjacent drums, the left hand drum of which rotates slower looking at the discharge end than the right hand drum of the confronting pair and they rotate in the same direction.

The eggs, presented broadside to the respective pairs of drums, engage between them. This occurs when the drums are rotated and while lowered as aforesaid. The drum rotated eggs are again turned 90° so that their longitudinal axes are parallel to the axes of the drums and the eggs are centered, as it were, between drums because of the reductions 78 in said drums. The pair of drums supporting the egg rotate counter-clockwise, looking at the discharge end, and the egg center of gravity lies between the drums supporting said egg. In other words, the fastest travelling egg supporting surface of the drums rotates toward the center of gravity of the egg thereon.

By way of explanation, a broadside presented egg is subjected to differential friction from the spaced drums straddled by the egg. The egg, in drum rotation, is turned as aforesaid. In turning, the egg advances along the drum until it reaches a position that the drums each engage an egg circle, the circles which are equal. Egg advance then ceases but egg rotation still continues as long as the rollers rotate. This egg centering disposes the egg for device 19 of said patent to properly engage it so that the egg, when presented to the opener of said patent, will be properly located thereon.

While so rotating there is advanced between each pair of drums an arm 19, see Figs. 1 and 2 of Sigler patent aforesaid. When drum rotation ceases, the drums then being elevated, the eggs are stationary and the arms 19 then are lifted and are retracted to draw off of the drums the eggs supported thereby to make way for another group of broadside presented eggs.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A device for spacing and aligning ovoid articles including in combination an endless conveyor, power means for advancing same, guide fins disposed above the conveyor and in close proximity to the upper run thereof, certain of the fins having intermediate divergingly directed portions and end portions, laterally offset and substantially parallel to the initial portion of the fins for effecting lateral article spacing in multiple article advance by said conveyor, and mechanism disposed contiguous to the discharge end of the conveyor for receiving the discharged laterally spaced articles therefrom, comprising pairs of spaced drums rotatable on axes extending longitudinally relatively to the travel of the conveyor, each pair being arranged to trap an article therebetween and support the same, and power means for rotating the drums to effect aligning and centralizing of the article thereon.

2. A device as defined by claim 1 wherein said mechanism includes a plate portion disposed between ends of the pairs of drums and the conveyor for article support during discharge from the latter to reception by the former.

3. A device as defined by claim 2 wherein the plate portion is movably mounted, and intermittently operable power means effects elevation and lowering of the plate portion in timed relation to article discharge.

4. A device for spacing and aligning ovoid articles including in combination an endless conveyor, power means for advancing same, guide fins disposed above the conveyor and in close proximity to the upper run thereof, certain of the fins having intermediate divergingly directed portions and end portions laterally offset and substantially parallel to the initial portion of the fins, for effecting lateral article spacing in multiple article advance by said conveyor, and mechanism disposed contiguous to the discharge end of the conveyor for receiving the discharged laterally spaced articles therefrom, comprising pairs of spaced drums, each pair being arranged to trap an article therebetween and support the same, and power means for rotating the drums to effect aligning and centralizing of the article thereon, the drums of each pair being similarly rotatable but at different speeds, said mechanism including a plate portion disposed between the pair of drums and the conveyor for article support during discharge from the latter to reception by the former.

5. A device for spacing and aligning ovoid articles including in combination an endless conveyor, power means for advancing same, guide fins disposed above the conveyor and in close proximity to the upper run thereof, certain of the fins having intermediate divergingly directed portions and end portions laterally offset and substantially parallel to the initial portion of the fins, for effecting lateral article spacing in multiple article advance by said conveyor, and mechanism disposed contiguous to the discharge end of the conveyor for receiving the discharged laterally spaced articles therefrom, comprising pairs of spaced drums, each pair being arranged to trap an article therebetween and support the same, and power means for rotating the drums to effect aligning and centralizing of the article thereon, said mechanism including a plate portion disposed between the pair of drums and the conveyor for article support during discharge from the latter to reception by the former, the plate portion being movably mounted, and intermittently operable power means effecting elevation and lowering of the plate portion in timed relation to article discharge, the drums being movably mounted, the intermittently operable power means effecting simultaneous like movement of the plate portion and the drums.

6. A device as defined by claim 1 wherein the conveyor comprises a pair of spaced chains interconnected by elongated pivot members and a plurality of longitudinally aligned roller elements rotatably carried by each pivot member.

7. A device as defined by claim 6 wherein support means is disposed beneath a portion of the upper run of the conveyor and is roller element engageable for effecting rotation thereon in conveyor advance, the support means comprises a plurality of parallel members, disposed longitudinally of the conveyor and of dissimilar length for effecting timed selective rotation of roller elements.

8. In an ovoid article aligning and transfer device the combination of a plurality of simultaneously movable elongated oscillatory article transfer members disposed in parallel and spaced relation, a pair of drums for each member and disposed at opposite sides thereof and having rotational axes similarly directed, and power means for rotating the drums of each pair in the same direction and at different rates.

9. A device as defined by claim 8 wherein there is provided a frame for power means support and a second frame for drum support, means pivotally supporting the latter frame upon the former, and intermittently operable means for intermittently tilting said drums.

10. A device as defined by claim 9 wherein a friction type transmission structure is provided, part of the structure being carried by one frame and the remainder being carried by the other frame, separation tilting effecting disengagement and collapse tilting effecting frictional engagement for effecting drum rotation.

11. A device as defined by claim 8 wherein the number of drums is one and one-half times the number of articles simultaneously handled by the drums, the adjacent drums being grouped in one order for power purposes and in accordance with another order for single article association.

12. A device as defined by claim 11 wherein the individual power grouped successive drums are each rotated at a lesser rate.

13. A device as defined by claim 12 wherein at least one of the power grouped drums is intermediately disposed relative to the end drums of that group, such intermediate drum functioning simultaneously in association with a pair of adjacent articles accommodated by the drums of that group.

14. An ovoid article positioning structure comprising a pair of spaced drum devices having substantially parallel axes of rotation, the devices having similar directions of rotation, and the rates of rotation being different, the article resting upon the upper surfaces of said devices, the fastest supporting surface rotating toward the adjacent supporting slower surface for aligning the article thereon with its major axis approximately parallel to the devices' axes.

15. Structure as defined by claim 14 wherein the devices have relieved portions between the ends thereof for effecting automatic limited translation of the article along its major axis until the circular contacts of the article upon the devices are substantially equal.

16. A device for spacing and aligning ovoid articles including in combination an endless conveyor, power means for advancing the same, guide fins disposed above the conveyor and in close proximity to the upper rung thereof, certain of the fins having intermediate divergingly directed portions, laterally offset and substantially parallel to the initial portion of the fins for effecting lateral articles spacing in multiple article advance by said conveyor, and mechanism disposed contiguous to the discharge end of the conveyor for receiving the discharged laterally spaced articles therefrom, comprising pairs of spaced drums, each pair being arranged to trap an article therebetween and support the same, the drums of each pair being similarly rotatable but at different speeds, and power means for rotating the drums to effect aligning and centralizing of the article thereon.

JAMES C. GILL.

REFERENCES CITED

The following references are of record in the file of this patent:

UNITED STATES PATENTS

| Number | Name | Date |
|---|---|---|
| 1,266,734 | White | May 21, 1918 |
| 1,858,732 | Farnham | May 17, 1932 |
| 2,070,980 | Wyland | Feb. 16, 1937 |
| 2,153,296 | Brogden | Apr. 4, 1939 |
| 2,190,620 | Milmoe et al. | Feb. 13, 1940 |
| 2,296,645 | Marsden | Sept. 22, 1942 |

FOREIGN PATENTS

| Number | Country | Date |
|---|---|---|
| 434,861 | Great Britain | Sept. 10, 1935 |
| 436,024 | Great Britain | Oct. 3, 1935 |